United States Patent
Kim et al.

(10) Patent No.: US 8,568,588 B2
(45) Date of Patent: Oct. 29, 2013

(54) APPARATUS FOR OSMOTIC POWER GENERATION AND DESALINATION USING SALINITY DIFFERENCE

(75) Inventors: Yu Chang Kim, Daejeon (KR); Sang Jin Park, Daejeon (KR); Young Kim, Daejeon (KR); In-Seob Park, Daejeon (KR); Byung-Ik Choi, Daejeon (KR); Kong Hoon Lee, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 284 days.

(21) Appl. No.: 13/182,582

(22) Filed: Jul. 14, 2011

(65) Prior Publication Data

US 2012/0012511 A1    Jan. 19, 2012

(30) Foreign Application Priority Data

Jul. 14, 2010   (KR) .................... 10-2010-0067714

(51) Int. Cl.
*B01D 61/06* (2006.01)
*B01D 61/08* (2006.01)
*B01D 61/18* (2006.01)
*C02F 1/44* (2006.01)

(52) U.S. Cl.
USPC .............. 210/321.66; 210/170.11; 210/195.2; 210/252; 210/257.2; 210/258; 210/321.6; 210/323.1

(58) Field of Classification Search
USPC .............. 210/170.11, 195.2, 252, 257.2, 258, 210/321.6, 321.66, 323.1
See application file for complete search history.

(56) References Cited

U.S. PATENT DOCUMENTS

| | | | |
|---|---|---|---|
| 6,391,205 B1 | 5/2002 | McGinnis | |
| 8,197,693 B2 * | 6/2012 | Al-Jlil | 210/652 |
| 2003/0205526 A1 | 11/2003 | Vuong | |
| 2009/0308727 A1 | 12/2009 | Kirts | |
| 2011/0044824 A1 * | 2/2011 | Kelada | 417/53 |

FOREIGN PATENT DOCUMENTS

| | | |
|---|---|---|
| JP | 20000202441 | 7/2000 |
| JP | 2003-176775 | 6/2003 |
| JP | 2005246158 | 9/2005 |
| JP | 2009047012 | 3/2009 |
| KR | 100842467 | 6/2008 |
| KR | 100943021 | 2/2010 |
| KR | 101011403 | 1/2011 |
| WO | 2009/037515 | 3/2009 |

OTHER PUBLICATIONS

European Patent Office, European Search Report, Application No. 11005772.6, Aug. 6, 2012.

* cited by examiner

*Primary Examiner* — John Kim
(74) *Attorney, Agent, or Firm* — Lexyoume IP Mesiter, PLLC.

(57) ABSTRACT

The apparatus for osmotic power generation and desalination using a salinity difference includes: a first osmotic membrane reactor having a first salt water position space and a third salt water position space separated by a first forward osmotic membrane; a second osmotic membrane reactor having a second salt water position space and a draw solution position space separated by a second forward osmotic membrane; a high pressure pump connected between the second salt water position space and the third salt water position space; a desalination unit obtaining fresh water by separating a draw solute from a draw solution diluted through a transmission of water in salt water of the second salt water position space by way of the draw solution position space; and a turbine driven by flow force of salt water discharged from the third salt water position space to produce electric energy.

4 Claims, 13 Drawing Sheets

APPARATUS FOR OSMOTIC POWER GENERATION AND DESALINATION USING SALINITY DIFFERENCE

CROSS-REFERENCE TO RELATED APPLICATION

This application claims priority to and the benefit of Korean Patent Application No. 10-2010-0067714 filed in the Korean Intellectual Property Office on Jul. 14, 2010, the entire contents of which are incorporated herein by reference.

BACKGROUND OF THE INVENTION (a) Field of the Invention

The present invention relates to an apparatus for producing electric energy by using salt water and an apparatus for producing fresh water by desalinating salt water.

(b) Description of the Related Art

There are various types of generation apparatus and methods for producing electric energy by using water, and recently, an osmotic power generation scheme using the difference in salinity between seawater and fresh water has been devised.

According to a conventional waterpower generation method (large hydropower generation or small hydropower generation) for producing electric energy by using water, electricity is produced by turning a turbine by using head and a flow rate of water kept in storage in a dam as constructed.

Namely, water is kept in storage at an upper stream of a dam, and the water is discharged to a lower stream of the dam by opening a floodgate such that the water is dropped to thus turn a turbine. In this process, potential energy of water is converted into kinetic energy of the turbine, and a rotor coil within the turbine is turned along the turbine to cause an electromagnetic induction phenomenon to generate current. Through this process, kinetic energy of the turbine is converted into electric energy.

In order to increase the generation capacity in waterpower generation, the discharged water is required to have greater potential energy. Waterpower generation using a dam, however, is disadvantageous in that generation cannot be continued when precipitation is small.

Thus, in order to solve the problem, a pumped-storage power generation, in which water of a lower stream of a dam which has been discharged is pumped up during a time duration in which power consumption is low and then discharged at the time of high power consumption to thus generate electricity, has been devised.

A conventional osmotic power generation scheme includes a process called pressure retarded osmosis (PRO). Namely, it is a scheme of producing power by turning a turbine by using a flow rate increased through osmosis occurring at a membrane and pressure applied in order to retard osmosis by using seawater and fresh water having the difference in salinity.

An output of the turbine is proportional to a head of water and a flow rate, so such a pressure retarded osmosis (PRO) scheme is used. As fresh water moves through the membrane, chemical potential energy of the fresh water is converted into mechanical energy having the same pressure as the pressure applied to seawater. However, this scheme is disadvantageous in that it is available only in an area where seawater (the sea) and fresh water (river) meet.

Meanwhile, a great quantity of water exists on earth, but water people may reliably have is insufficient. For this reason or so, a technique of desalinating seawater has been developed.

In order to obtain fresh water from seawater, a process of removing components inappropriate for water or intake water from components dissolved in or floating on seawater is required.

Methods for desalinating seawater into fresh water includes a reverse osmosis process, an electro-dialysis process, an evaporation process of changing raw water into steam to thus desalinate the water, a freezing process, a solar heat usage method, or the like.

Among the methods for desalinating seawater, the reverse osmosis process and the electro-dialysis process are commonly used.

A desalination apparatus using the reverse osmosis process has a structure in which ionic material dissolved in seawater is removed by a reverse osmotic membrane allowing pure water, excluding an ionic material dissolved in water, to pass therethrough.

In order to separate ionic material and pure water from raw water, a pressure higher than osmosis is required, and the pressure at this time is called reverse osmosis. In case of seawater desalination, a high pressure of about 42 bar to 70 bar is required.

In order to provide such reverse osmosis, the desalination apparatus includes a raw water supply unit (a supply pump, or the like) for pumping raw water.

In general, since the conventional desalination apparatus uses a high pressure pump consuming most power, as a raw water supply unit, it has shortcomings in that a great amount of energy is consumed for desalinating seawater.

A wind-powered desalination apparatus using natural energy without power consumption may also be used. In this case, a raw water supply unit provided in the desalination apparatus has a structure in which raw water supplied by installing a windmill is stored in a pressure tank (a pressurizer) and maintained at a certain pressure, and as high pressure raw water discharged from the pressure tank passes through a preprocessor device, a foreign object is filtered out, and the filtered raw water is put into a reverse osmosis device so that fresh water can be separated by a reverse osmotic membrane.

The windmill employs a structure in which rotary force of a rotor, a blade which rotates by wind velocity, is converted into vertical reciprocal movement to allow a movement member within a cylinder to vertically move to perform pumping.

However, the scheme using a windmill is disadvantageous in that it can be driven only under a condition in which sufficient energy can be obtained through wind velocity. Also, it can be used only under a condition in which salinity is relatively low.

Since the reverse osmosis process consumes much energy, recently, a forward osmosis process of separating water from seawater through only pure osmosis without using a high pressure pump, or the like, has been developed.

However, in the forward osmosis process, a draw solution including a high concentration draw solute compared with seawater is used, it is difficult to separate the draw solute from the draw solution diluted by water moved through a forward osmotic membrane.

Meanwhile, the related art forward osmosis process also has a problem in which a considerably long period of time is required to desalinate seawater.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus having advantages of generating electricity by inducing osmosis by using only salt water even in an area where seawater and fresh water do not meet, namely, in an area where there is no fresh water, and desalinating seawater, and a multi-purpose processing method.

Electricity and water can be simultaneously obtained by using salt water through the apparatus and method according to embodiments of the present invention.

An exemplary embodiment of the present invention provides an apparatus for osmotic power generation using a salinity difference and desalination, including: a first osmotic membrane reactor including a first salt water position space through which supplied salt water (or feed salt water) passes, and a third salt water position space through which salt water having a salt concentration higher than that of salt water positioned in the first salt water position space passes, the first and third salt water position spaces being separated by a first forward osmotic membrane; a second osmotic membrane reactor including a second salt water position space through which supplied salt water passes, and a draw solution position space in which a draw solution is positioned, the second salt water position space and the draw solution position space being separated by a second forward osmotic membrane; a high pressure pump connected between the second salt water position space and the third salt water position space and supplying salt water which has passed through the second salt water position space to the third salt water position space and pressurizing salt water, which has passed through the second salt water position space, to supply it to the third salt water position space such that pressure retarded osmosis (PRO) can be made in the first osmotic membrane reactor; a desalination unit obtaining fresh water by separating a draw solute from a draw solution diluted through a transmission of water in salt water of the second salt water position space by way of the draw solution position space of the second osmotic membrane reactor; and a turbine connected to a downstream side of the third salt water position space and driven by flow force of salt water discharged from the third salt water position space to produce electric energy.

The first salt water position space of the first osmotic membrane reactor and the second salt water position space of the second osmotic membrane reactor may be connected, and salt water, which has passed through the first salt water position space, may flow into the second salt water position space.

The apparatus may further include: an energy recovery device (ERD) connected between the second salt water position space and the high pressure pump and configured to allow salt water, which is discharged from the second salt water position space, to pass therethrough, wherein salt water discharged from the third salt water position space may pass through the energy recovery device.

Salt water supplied to the first salt water position space may be seawater or brackish water.

Another embodiment of the present invention provides an apparatus for osmotic power generation and desalination using a salinity difference, including: a forward osmotic membrane reactor including a first salt water position space through which supplied salt water passes, and a third salt water position space through which salt water having a salt concentration higher than that of salt water positioned in the first salt water position space passes, the first and third salt water position spaces being separated by a forward osmotic membrane; a reverse osmotic membrane reactor including a second salt water position space through which supplied salt water passes, and a fresh water position space in which fresh water is positioned, the second salt water position space and the fresh water position space being separated by reverse osmotic membrane; a high pressure pump connected at an upstream side of the reverse osmotic membrane reactor and pressurizing salt water supplied to the second salt water position space; a pressure reduction valve connected between the second salt water position space and the third salt water position space and reducing pressure of salt water supplied from the second salt water position space to the third salt water position space; and a turbine connected to a downstream side of the third salt water position space and driven by flow force of salt water discharged from the third salt water position space to produce electric energy.

Salt water supplied to the first salt water position space or the second salt water position space may be brackish water.

Yet another embodiment of the present invention provides an apparatus for osmotic power generation and desalination using a salinity difference, including: a forward osmotic membrane reactor including a first salt water position space through which supplied salt water passes, and a third salt water position space through which salt water having a salt concentration higher than that of salt water positioned in the first salt water position space passes, the first and third salt water position spaces being separated by a forward osmotic membrane; a reverse osmotic membrane reactor including a second salt water position space through which supplied salt water passes, and a fresh water position space in which fresh water is positioned, the second salt water position space and the fresh water position space being separated by reverse osmotic membrane; a high pressure pump connected at an upstream side of the reverse osmotic membrane reactor and pressurizing salt water supplied to the second salt water position space; an energy recovery device (ERD) connected between the second salt water position space and the third salt water position space and allowing salt water supplied from the second salt water position space to the third salt water position space to pass therethrough and salt water supplied to the second salt water position space to pass therethrough; and a turbine connected to a downstream side of the third salt water position space and driven by flow force of salt water discharged from the third salt water position space to produce electric energy.

The second salt water position space and the third salt water position space may be connected to allow salt water discharged from the second salt water position space to be supplied to the third salt water position space.

Salt water supplied to the first salt water position space or the second salt water position space may be brackish water.

In a generation and desalination method, a draw solute may include ammonium bicarbonate ($NH_4HCO_3$), and a process of desalinating salt water by using the second osmotic membrane reactor may include a draw solute vaporization step of applying an ultrasonic wave to a draw solution which has passed through a draw solution position space to cause a cavitation phenomenon in the draw solution to thus separate ammonia and carbon dioxide included in the draw solution.

The process of desalinating salt water may further include a regeneration step of including ammonia and carbon dioxide separated in the draw solute vaporization step in fresh water or a draw solution.

The process of desalinating salt water may further include a vacuum floatation step of allowing the draw solution, which has passed through the draw solute vaporization step, and which is maintained in a vacuum state, to pass through a vacuum flotation tub having a vacuum maintaining space.

Thus, according to the method for desalinating seawater and generating electricity, osmotic power generation and desalination of seawater can be performed by osmosis using only seawater even in an area in which seawater and fresh water do not meet, thus obtaining both electricity and water.

DETAILED DESCRIPTION OF THE EMBODIMENTS

Technical concept of the present invention will be described in detail with reference to the accompanying drawings. However, accompanying drawings are merely an example illustrated to explain a technical concept of the present invention in detail, so the technical concept of the present invention is not limited to the configuration of the accompanying drawings.

The present invention relates to a power generation device for producing electric energy by using salt water such that the electric energy is produced by driving a turbine by flow force of salt water according to osmosis. The salt water may be seawater or brackish water.

Figure 1:
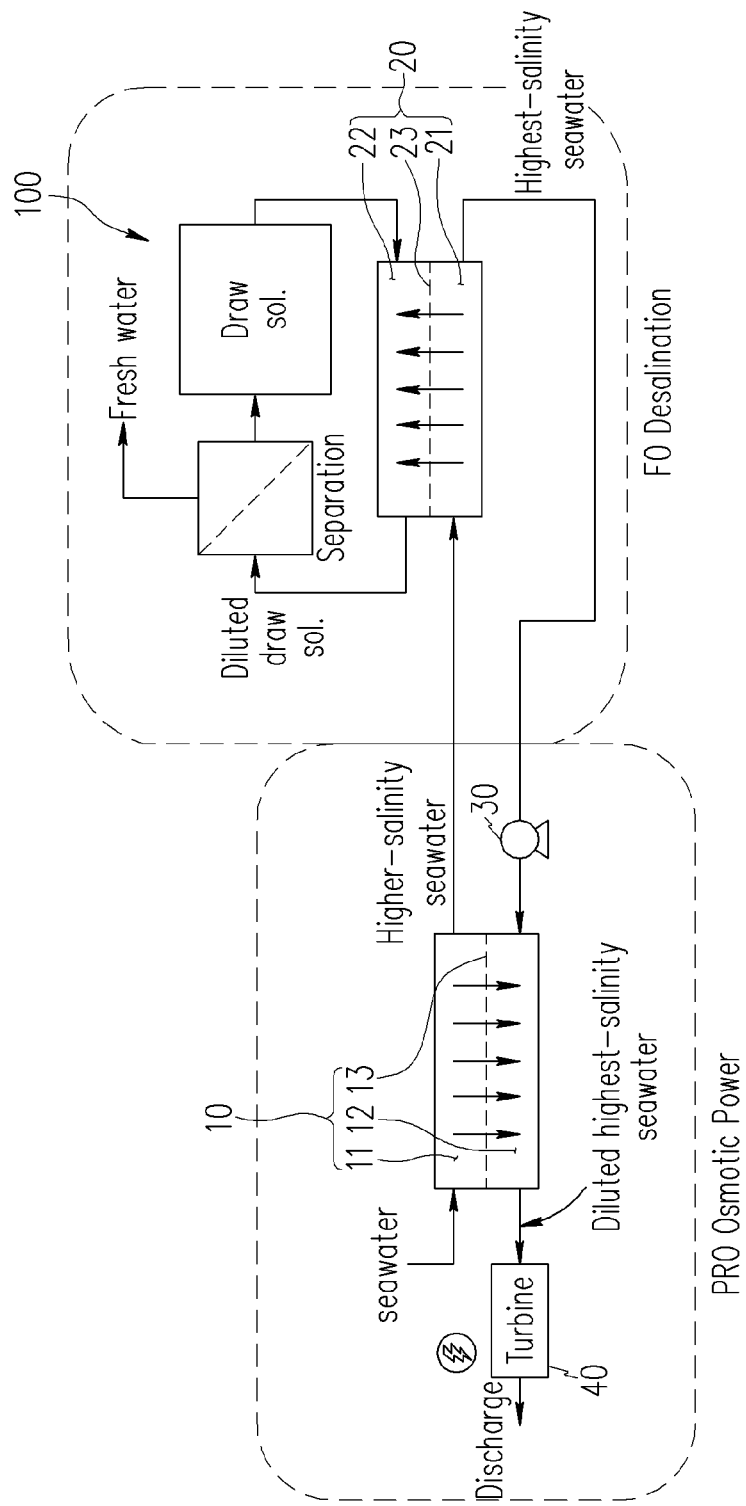
FIG. 1 is a schematic view of an apparatus for osmotic power generation and desalination according to a first embodiment of the present invention.
Figure 2:
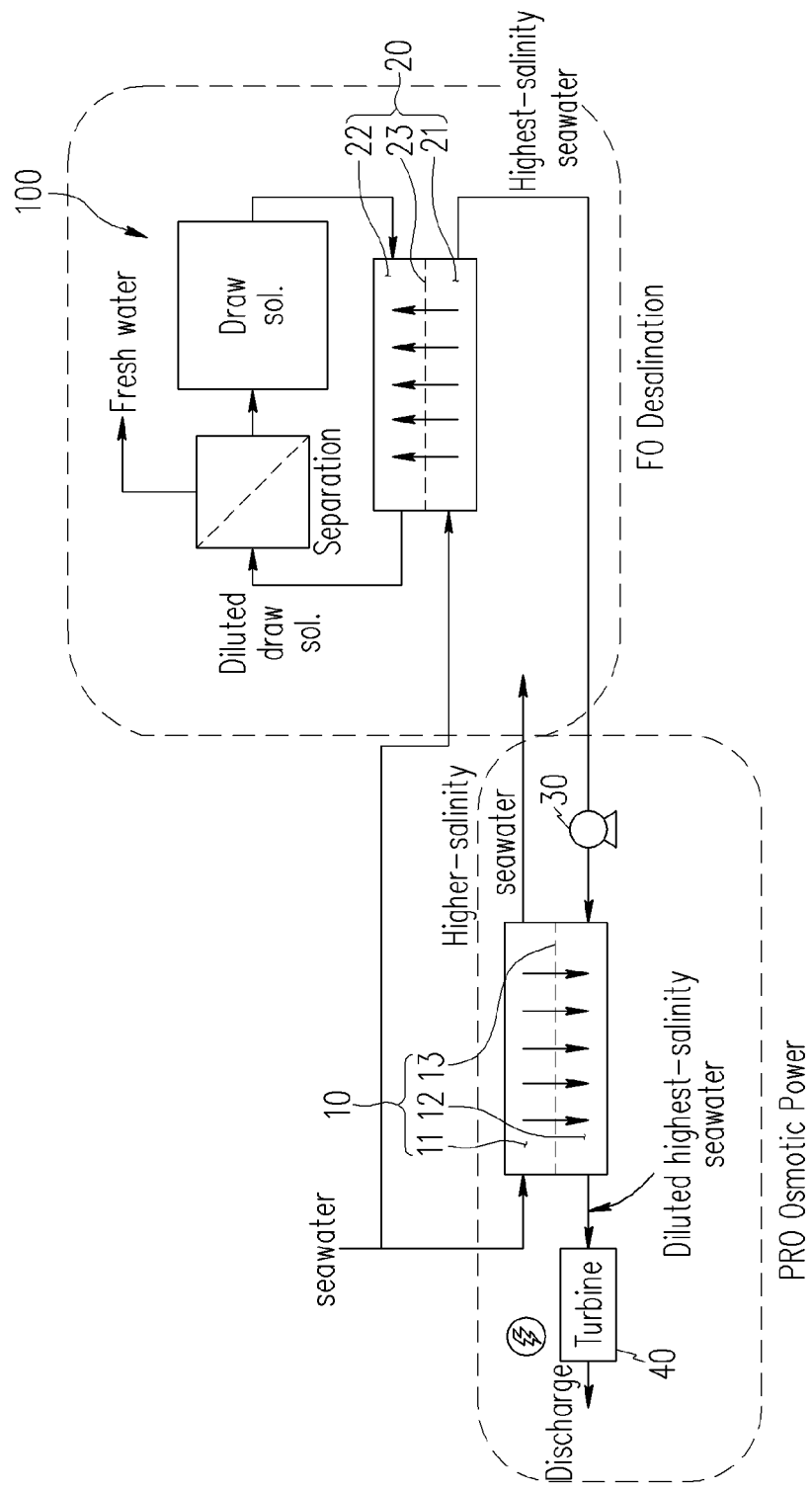
FIG. 2 is a schematic view of a modification of an apparatus for osmotic power generation and desalination according to the first embodiment of the present invention.

FIG. 1 is a schematic view of an apparatus for osmotic power generation and desalination according to a first embodiment of the present invention, and FIG. 2 is a schematic view of a modification of an apparatus for osmotic power generation and desalination according to the first embodiment of the present invention.

An osmotic power generation device according to the present embodiment includes a first osmotic membrane reactor 10 and a second osmotic membrane reactor 20 for using osmosis according to salinity of seawater The osmotic power generation device according to the present embodiment further includes a turbine 40 driven by flow force of seawater discharged from the first osmotic membrane reactor 10.

Here, the present embodiment aims at carrying out osmotic power generation by inducing osmosis only with seawater even in an area in which seawater and fresh water do not meet. In addition, the present embodiment aims at desalinating seawater as well as power generation.

The first osmotic membrane reactor 10 includes a first salt water position space 11 through which supplied seawater (or feed seawater) passes, and a third salt water position space 12 through which seawater (highest-salinity seawater) having salt concentration higher than that of seawater positioned in the first salt water position space 11. The first salt water position space 11 and the third salt water position space 12 are separated by a first forward osmotic membrane 13.

The second osmotic membrane reactor 20 includes a second salt water position space 21 through which seawater (higher-salinity seawater), which has concentration increased as the seawater passed through the first salt water position space 11, passes and a draw solution position space 22 in which a draw solution including a draw solute inducing osmosis is positioned. The second salt water position space 212 and the draw solution position space 22 are separated by a second forward osmotic membrane 23.

A high pressure pump 30 is connected between the second salt water position space 21 and the third salt water position space 12. The high pressure pump 30 supplies seawater (highest-salinity seawater), which has high concentration increased upon having passed through the second salt water position space 21, to the third salt water position space 12, and in this case, the high pressure pump 30 may apply pressure to the seawater such that pressure retarded osmosis (PRO) can be made in the first osmotic membrane reactor 10.

The turbine 40 is connected to a rear side of the third salt water position space 12. The turbine 40 is driven by flow force of the seawater output from the third salt water position space 12 and having pressure increased upon having passed through the second osmotic membrane reactor 20 through the high pressure pump 30, to generate electric energy.

Also, the osmotic power generation device according to the present embodiment includes a desalination unit 100 obtaining fresh water by separating a draw solute from the draw solution which has passed through the draw solution position space 22 of the second osmotic membrane reactor 20.

The structure of the first osmotic membrane reactor 10 or the second osmotic membrane reactor 20 is the same as that of a general osmotic membrane reactor, so a osmotic membrane reactor having a known structure may be employed, and also, a high pressure pump having a known structure may be employed as the high pressure pump 30, and thus, a detailed description thereof will be omitted.

In the above description, the pressure retarded osmosis (PRO) refers to a phenomenon in which when pressure, which is lower than an osmotic pressure when water of a solution having a low concentration moves through the forward osmotic membrane 13 according to osmosis, is applied to a solution having a high concentration, osmosis is retarded to a degree and the water, which has passed through the membrane, is energy-converted with the same pressure as that applied to a high pressure pump (i.e., chemical potential energy of water is converted into high pressure mechanical energy).

The amount discharged from the membrane is equivalent to the sum of the amount of water which has passed through the membrane and the amount of seawater which has passed through the high pressure pump.

Here, the water, which has passed purely through the membrane according to osmosis is mixed with the highest-salinity seawater to have the same pressure as the pressure (lower than osmotic pressure) applied by the high pressure pump.

Namely, when pressure acting in a direction opposite to the direction in which osmotic pressure is applied is higher than the osmotic pressure, reverse osmosis (RO) takes place, when no pressure is applied, forward osmosis (FO) takes place, and when a pressure lower than osmotic pressure is applied, pressure retarded osmosis (PRO) takes place.

In the present embodiment, under the condition in which a pressure is not applied to the third salt water position space 12 in the first osmotic membrane reactor 10, water of the first salt water position space 11 moves to the third salt water position space 12 through the first forward osmotic membrane 13 according to osmosis, and this phenomenon corresponds to forward osmosis.

When the pressure applied to the third salt water position space 12 is higher than osmotic pressure through the first forward osmotic membrane 13, water of the third salt water position space 12 moves to the first salt water position space 11, and this phenomenon corresponds to reverse osmosis.

When the pressure applied to the third salt water position space 12 is lower than osmosis through the first forward osmotic membrane 13, water positioned in the first salt water position space 11 moves to the third salt water position space 12, but in this case, the amount of the water is smaller than that under the forward osmotic condition. This phenomenon corresponds to pressure retarded osmosis.

The desalination unit 100 in the foregoing description may be implemented as a desalination unit in various known forms.

The apparatus for osmotic power generation and desalination according to the first embodiment of the present invention illustrated in FIG. 1 is configured such that seawater goes through the first salt water position space 11 of the first osmotic membrane reactor 10, flows into the second salt water position space 21 of the second osmotic membrane reactor 20, and then passes through the third salt water position space 12 of the first osmotic membrane reactor 10.

Meanwhile, in an apparatus for osmotic power generation and desalination according to a modification of the first embodiment of the present invention illustrated in FIG. 2 is configured such that seawater passing through the first salt water position space 11 of the first osmotic membrane reactor 10 and seawater passing through the second salt water position space 21 of the second osmotic membrane reactor 20 exist separately, and after seawater passes through the second salt water position space 21 of the second osmotic membrane reactor 20 (here, the seawater has a high concentration), it passes through the third salt water position space 12 of the first osmotic membrane reactor 10.

Compared with the structure illustrated in FIG. 2, the structure illustrated in FIG. 1 makes the difference between salinities of both seawaters of the forward osmotic membrane larger and has a simpler piping structure.

According to the present embodiment as described above, power can be generated by using seawater even in an area in which seawater and fresh water do not meet, and seawater can be desalinated. Since the draw solution for desalination is separated, regenerated, and circulated to continuously pass through the draw solution position space of the second osmotic membrane reactor, there is little loss of the draw solute.

In a method for osmotic power generation and desalination according to a first embodiment of the present invention using the foregoing apparatus, seawater is supplied to the first salt water position space 11 of the first osmotic membrane reactor 10 having the first salt water position space 11 and the third salt water position space 12 separated by the forward osmotic membrane, and seawater (highest-salinity seawater) having a higher salt concentration than that of the seawater supplied to the first salt water position space 11 is supplied by using the high pressure pump 30 to the third salt water position space 12 such that pressure retarded osmosis takes place in the first osmotic membrane reactor 10, and the turbine 40 is driven by flow force of the high pressure seawater discharged by way of the first osmotic membrane reactor 10.

Also, since the draw solution position space 22 in which the draw solution including a draw solute inducing osmosis and the second salt water position space 21 through which seawater (higher-salinity seawater) passes is separated by the second forward osmotic membrane 23, seawater (highest-salinity seawater having an increased concentration) which has passed through the second salt water position space 21 of the second osmotic membrane reactor 20 used for desalinating seawater is supplied to the third salt water position space 12 of the first osmotic membrane reactor 10 by the high pressure pump 30.

Here, as for the concentration of the aforementioned seawater and the draw solution, they can be arranged in order of high concentration as follows.

Figure 3:
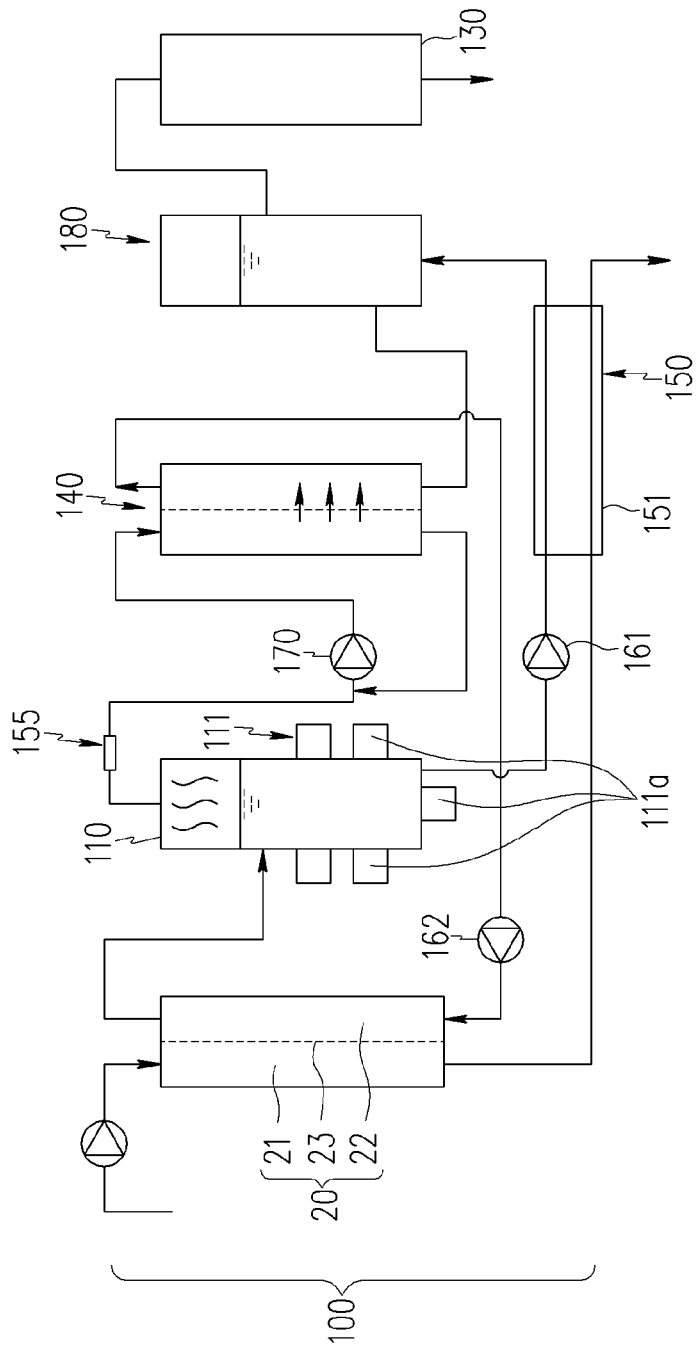
FIG. 3 is a schematic view for explaining a desalination unit as a constituent element of the apparatus for osmotic power generation and desalination according to the first embodiment of the present invention.

Draw solution>>seawater in the third seawater position space (highest-salinity seawater)>seawater in the second seawater position space (higher-salinity seawater)>seawater in the first seawater position space The desalination unit 100 may be implemented in a known form, but it may also be implemented as shown in FIG. 3 in order to quickly desalinate seawater, reduce energy consumption, quickly separate a draw solute, and obtain excellent reuse efficiency.

The desalination unit 100 illustrated in FIG. 3 has a structure in which a draw solution including ammonium bicarbonate ($NH_4HCO_3$) is positioned in the draw solution position space 22 of the second osmotic membrane reactor 20.

In this case, however, in the structure using ammonium bicarbonate ($NH_4HCO_3$), the draw solution which has passed through the draw solution position space 22 is not in the form of fresh water which can be used.

In order to make the draw solution in the form of fresh water which can be used, ammonia and carbon dioxide need to be removed from the draw solution diluted when it passed through the draw solution position space 22.

The inventor of the present application conducted various researches to remove ammonia and carbon dioxide included in the diluted draw solution.

Such results that ammonia and carbon dioxide could be removed through a method of heating the diluted draw solution were obtained, but still a considerable amount of ammonia remained, reaching a conclusion that another means is required to remove the remaining ammonia.

In the method for heating the diluted draw solution, when the draw solution was heated at 60° C., about 85% of ammonia was removed and 99% of carbon dioxide was removed.

However, such a heating method was disadvantageous in that considerable thermal energy was required for heating and a long period of time was required for the heating, making it difficult to quickly perform desalination.

Also, a separate means for removing the remaining ammonia is required.

In the process of research, the inventor of the present application obtained the results that most of the ammonia and carbon dioxide were vaporized and separated due to a cavitation phenomenon in which when ultrasonic waves are applied to the diluted draw solution, cavities are generated. Cavities refers to bubbles, generated as ultrasonic waves are applied to underwater, are in a vacuum state and have a micrometer (μm) size. Cavities are quickly (in units of a few microseconds) generated and become extinct (burst) repeatedly. The generation of cavities is called a cavitation phenomenon.

Application of ultrasonic waves to the diluted draw solution consumes a very small amount of energy and quickly separates ammonia and carbon dioxide, so the inventor of the present application came to a conclusion that it is quite appropriate for achieving the object of the present invention.

Thus, the desalination unit 100, a constituent element of the present invention, may be implemented in the form of being configured to include a space to which a draw solution which has passed through the second osmotic membrane reactor 20 flows and in which gas generated from the draw solution is positioned and an ultrasonic reactor 110 having an ultrasonic output unit 111 for generating a cavitation phenomenon in the draw solution by applying ultrasonic waves to the introduced draw solution.

The cavitation phenomenon has a sterilization effect, so if the draw solution has germs or microbes, such gems or microbes can be removed.

As the ultrasonic output unit 111, a known ultrasonic output unit may be used, so a detailed description thereof will be omitted.

Figure 5:
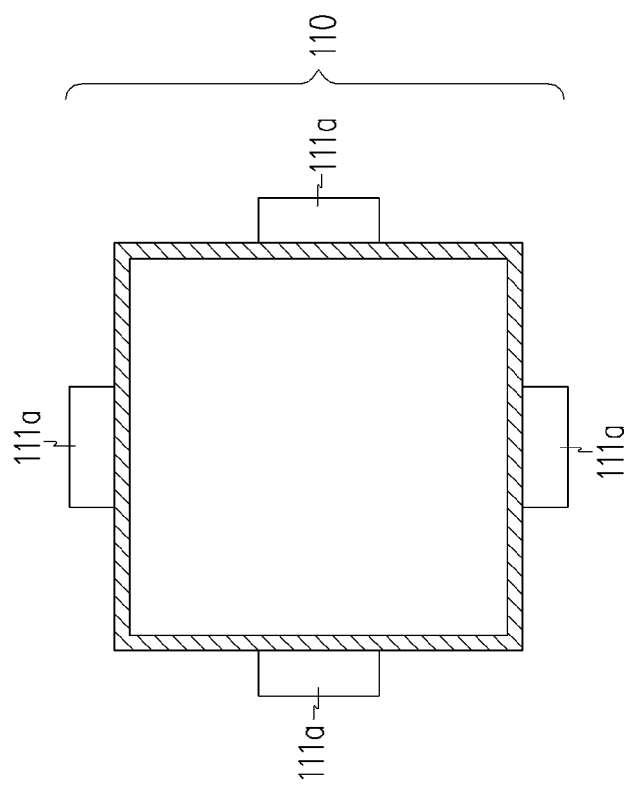
FIG. 5 is a schematic view for explaining the ultrasonic reactor having a plurality of ultrasonic output bodies radially positioned on an outer circumferential surface thereof in the desalination unit as a constituent element of the apparatus for osmotic power generation and desalination according to the first embodiment of the present invention.

A plurality of ultrasonic output bodies 111a of the ultrasonic output unit 111 are positioned on an outer circumferential surface of the ultrasonic reactor 110 such that they are positioned in a radial form based on a central portion, of the space of the ultrasonic reactor 110, in which the draw solution is positioned (See FIG. 5).

This is because if ultrasonic waves are output from only one direction, cavities could not be evenly distributed in the diluted draw solution.

In order to smoothly vaporize ammonia and carbon dioxide, cavities need to be evenly distributed in the diluted draw solution.

When most of ammonia and carbon dioxide are removed as the diluted draw solution passes through the ultrasonic reactor 110, fresh water in an available state can be obtained.

However, in order to more reliably remove a remaining small amount of ammonia and carbon dioxide, an additional process must be performed.

Figure 4:
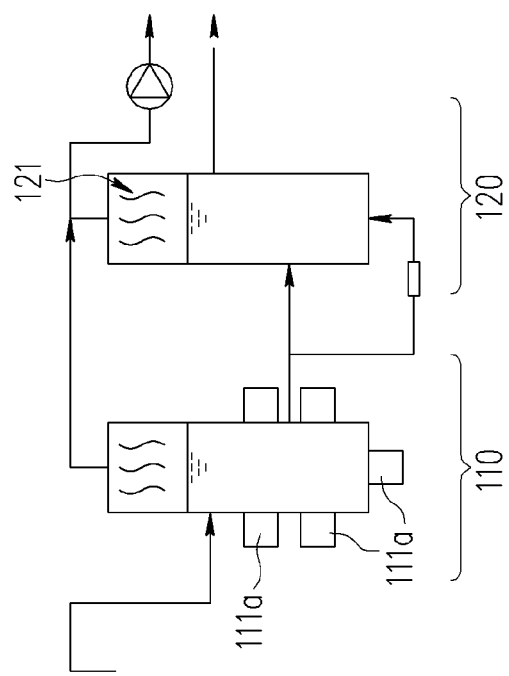
FIG. 4 is a schematic view for explaining an ultrasonic reactor and a vacuum floatation tub in the desalination unit as a constituent element of the apparatus for osmotic power generation and desalination according to the first embodiment of the present invention.

In detail, with reference to FIG. 4, a vacuum floatation tub 120 having a vacuum maintaining space 121 to which the draw solution, which has passed through the ultrasonic reactor 110, is introduced and in which a vacuum state is maintained, and an air sparging unit (or an aeration unit) for sparging air to the draw solution (diluted draw solution) positioned in the vacuum floatation tub 120 may be further provided.

According to the configuration, when the draw solution saturated with air is introduced into the vacuum floatation tub 120, the saturated air is discharged as a great amount of fine bubbles (air bubbles) in the draw solution, and a small amount of remaining ammonia and carbon dioxide are absorbed into the fine bubbles so as to be removed.

As the vacuum floatation tub 120 having the vacuum maintaining space 121 or the air sparging unit for sparging air into the solution to make it saturated, a known air sparging unit may be used, so a detailed description thereof will be omitted.

In order to reliably remove the remaining ammonia and carbon dioxide, besides the foregoing method, the desalination unit 100 may further include an activated carbon reactor 130 having an activated carbon layer with which the draw solution in contact upon being introduced after passing through the ultrasonic reactor 110.

Namely, the remaining ammonia and carbon dioxide are removed by the activated carbon.

In a different method, the desalination unit 100 may further include a zeolite reactor having zeolite with which the draw solution in contact upon being introduced after passing through the ultrasonic reactor 110.

Namely, the remaining ammonia and carbon dioxide are removed by the zeolite.

The desalination unit 100 may be implemented to include both the foregoing vacuum floatation tub 120 and the activated carbon reactor 130 may be provided to be used, to include both the vacuum floatation tub 120 and the zeolite reactor may be provided to be used, or to include all the vacuum flotation tub 120, the activated carbon reactor 130, and the zeolite reactor.

In the foregoing desalination unit 100, when vaporized ammonia and carbon dioxide are dissolved in fresh water by the ultrasonic reactor 110, a draw solution which may be supplied to the draw solution position space 22 of the second osmotic membrane reactor 20 can be generated.

When the desalination unit 100 is implemented in this manner, since vaporized ammonia and carbon dioxide are reused, ammonium bicarbonate is not required to be continuously put into the apparatus of the present invention.

Of course, when vaporized ammonia and carbon dioxide are dissolved in the draw solution to be supplied to the draw solution position space 22 of the second osmotic membrane reactor 20, rather than being dissolved in pure fresh water, higher concentration draw solution can be obtained.

Thus, the desalination unit 100 may further include a draw solution regenerator 140 for supplying gas generated in the ultrasonic reactor 110 to the draw solution, which is to be supplied to the draw solution position space 22 of the second osmotic membrane reactor 20, so as to be liquefied.

FIG. 3 shows the structure in which vaporized ammonia and carbon dioxide are supplied to and dissolved in fresh water to form a draw solution, which is then supplied to the draw solution position space 22 of the second osmotic membrane reactor 20.

In this case, when the solution is in contact with gas through a membrane, rather than directly sparging gas to the solution, solubility of the gas becomes better.

Figure 8:
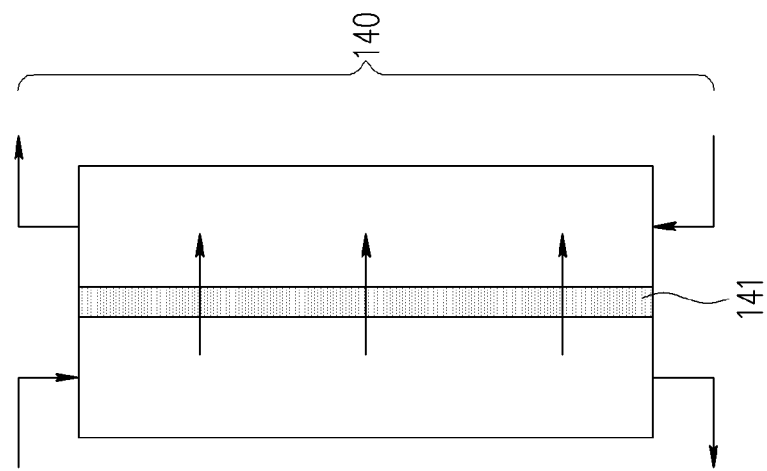
FIG. 8 is a schematic view for explaining a membrane contact type draw solution regenerator in the desalination unit as a constituent element of the apparatus for osmotic power generation and desalination according to the first embodiment of the present invention.

Thus, as shown in FIG. 8, the draw solution regenerator 140 may be configured to have a membrane contact type including a membrane contactor 141 having a plurality of pores. Since the membrane contactor 141 allowing gas and a liquid to be brought into contact to dissolve gas in the liquid is configured as a hydrophobic membrane, the gas can pass therethrough while a liquid cannot. As the membrane contactor 141, a membrane contactor having a known structure can be applicable, so a detailed description thereof will be omitted.

In the structure including the draw solution regenerator 140, preferably, the desalination unit 100 may further include a cooling unit 155 for cooling gas generated in the ultrasonic reactor 110 before the gas reaches the draw solution regenerator 140.

In particular, more preferably, the cooling unit 155 may be provided in the structure having the membrane contactor.

This is because vapor generated by decomposing ammonium bicarbonate salt need to be cooled to be removed in order to prevent ammonia and carbon dioxide from being precipitated as ammonium bicarbonate salt again, and vaporized ammonia and carbon dioxide can be easily dissolved in a solution at a low temperature.

The cooling unit may be implemented as a known type cooling unit.

However, in consideration of energy efficiency, preferably, the cooling unit may be implemented in a form having a heat exchanger allowing seawater supplied for desalination and gas generated in the ultrasonic reactor 110 to be heat-exchanged.

Namely, seawater supplied for desalination has a relatively low temperature, and gas (including vaporized ammonia and carbon dioxide) generated in the ultrasonic reactor 110 has a high temperature. Thus, when gas generated in the ultrasonic reactor 110 and seawater supplied for desalination are heat-exchanged, the gas can be cooled to have a temperature as low as required.

Of course, the desalination unit 100 may be implemented to further include a cooler, or the like, but in such a case, energy efficiency will be degraded.

Figure 6:
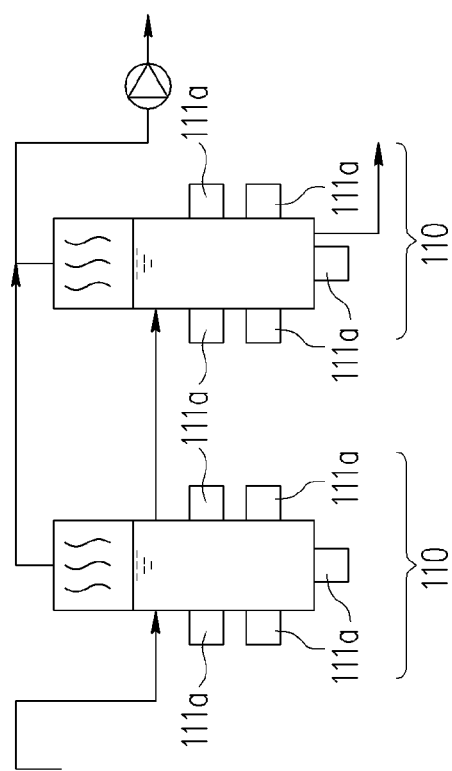
FIG. 6 is a schematic view for explaining a plurality of ultrasonic reactors connected in series in the desalination unit as a constituent element of the apparatus for osmotic power generation and desalination according to the first embodiment of the present invention.

In the foregoing desalination unit 100, as shown in FIG. 6, a plurality of ultrasonic reactors 110 may be connected in series in order to more smoothly and quickly separate ammonia and carbon dioxide.

Figure 7:
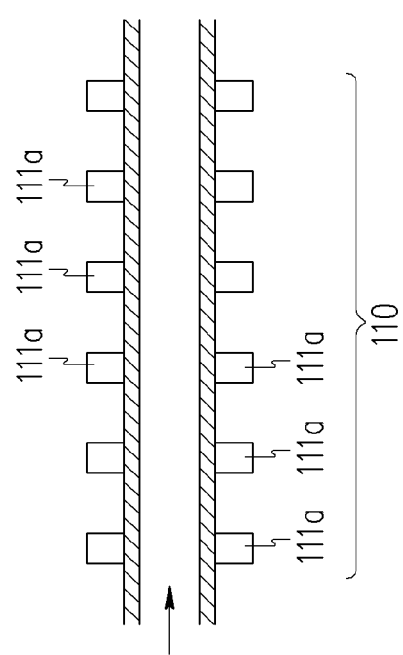
FIG. 7 is a schematic view for explaining an ultrasonic reactor in the form of a pipe in the desalination unit as a constituent element of the apparatus for osmotic power generation and desalination according to the first embodiment of the present invention.

Also, as shown in FIG. 7, the ultrasonic reactor 110 may be implemented in the form of piping.

Reference numeral 150 denotes a cooling unit, 151 denotes a heat exchanger, 161 and 161 denote supply pumps, 170 denotes a compressor, and 180 denotes a drinking water separator.

Figure 9:
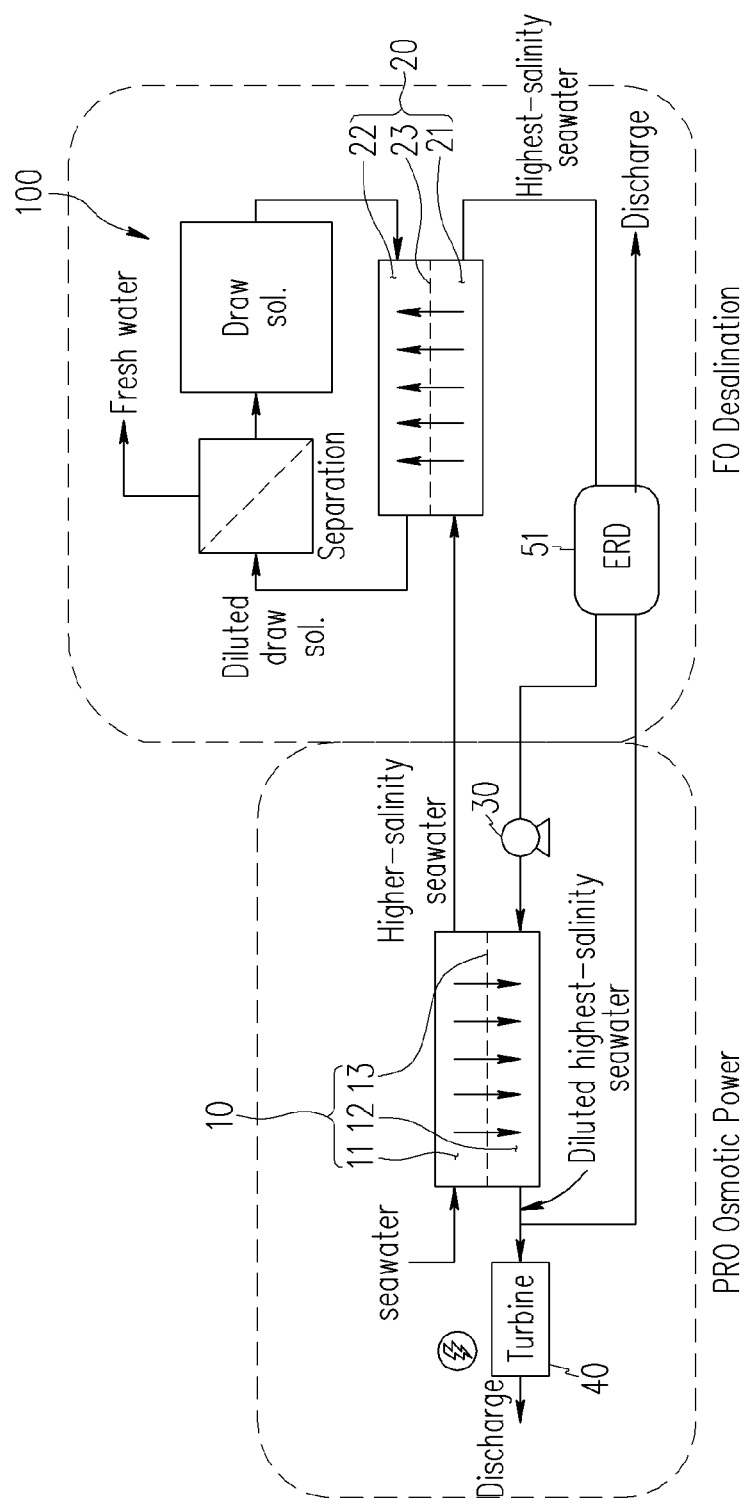
FIG. 9 is a schematic view of an apparatus for osmotic power generation and desalination according to a second embodiment of the present invention.

FIG. 9 is a schematic view of an apparatus for osmotic power generation and desalination according to a second embodiment of the present invention.

The apparatus for osmotic power generation and desalination according to the second embodiment of the present invention includes all the components of the apparatus according to the first embodiment of the present invention illustrated in FIG. 1, and further includes an energy recovery device (ERD) 51.

The energy recovery device (ERD) 51 is connected between the second salt water position space 21 of the second osmotic membrane reactor 20 and the high pressure pump 30 to allow seawater discharged from the second salt water position space 21 to pass therethrough. Also, seawater discharged from the third salt water position space 12 passes through the ERD 51.

The high pressure diluted high salinity seawater (or diluted highest salinity seawater) discharged from the third salt water position space 12 flows to be introduced into the ERD 51, is brought into direct contact with ultra-high salinity seawater (or highest-salinity seawater) to deliver pressure, and then discharged in a state of having a lowered pressure.

The ERD 51 can reduce a load of the high pressure pump 30 by using the pressure of a portion of the high pressure diluted high salinity seawater (or diluted highest salinity seawater) discharged from the third salt water position space 12, thus increasing net power generation of the osmotic power generation apparatus.

Figure 10:
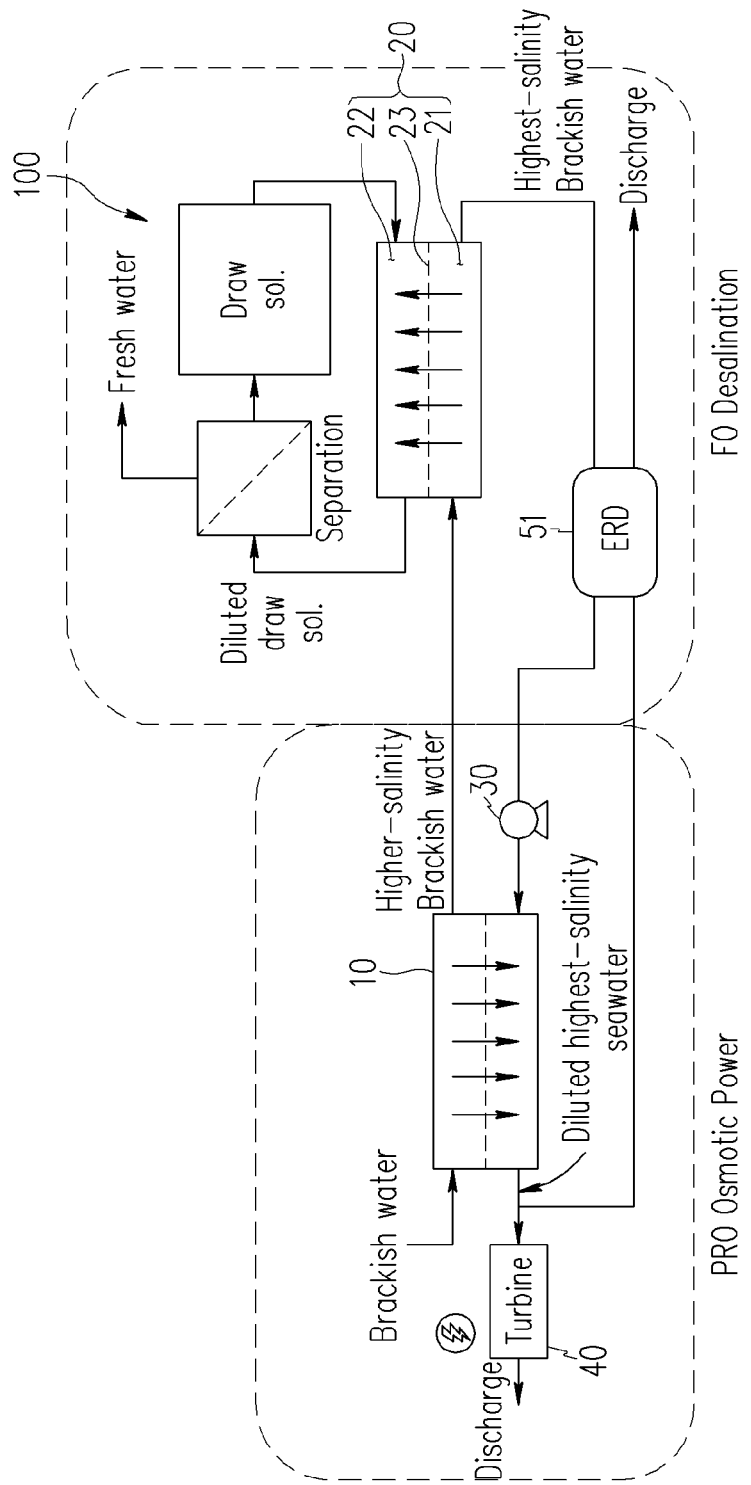
FIG. 10 is a schematic view of a modification of an apparatus for osmotic power generation and desalination according to the second embodiment of the present invention.

FIG. 10 is a schematic view of a modification of an apparatus for osmotic power generation and desalination according to the second embodiment of the present invention.

In the modification, the apparatus is configured to have the same structure as the apparatus for osmotic power generation and desalination according to the second embodiment of the present invention, but in the modification, brackish water, instead of seawater, is supplied to the first salt water position space 11 of the first osmotic membrane reactor 10.

In general, when underground water is extracted in the vicinity of the seashore, brackish water having salinity of one-tenth of that of seawater can be obtained. Such brackish water generally has salinity of 5,000 ppm or lower, although there is a difference according to the concentration of ambient seawater.

In the apparatus according to the present embodiment, the use of brackish water may be more advantageous for forming a concentration difference in the process of passing through the first osmotic membrane reactor 10 and the second osmotic membrane reactor 20.

Figure 11:
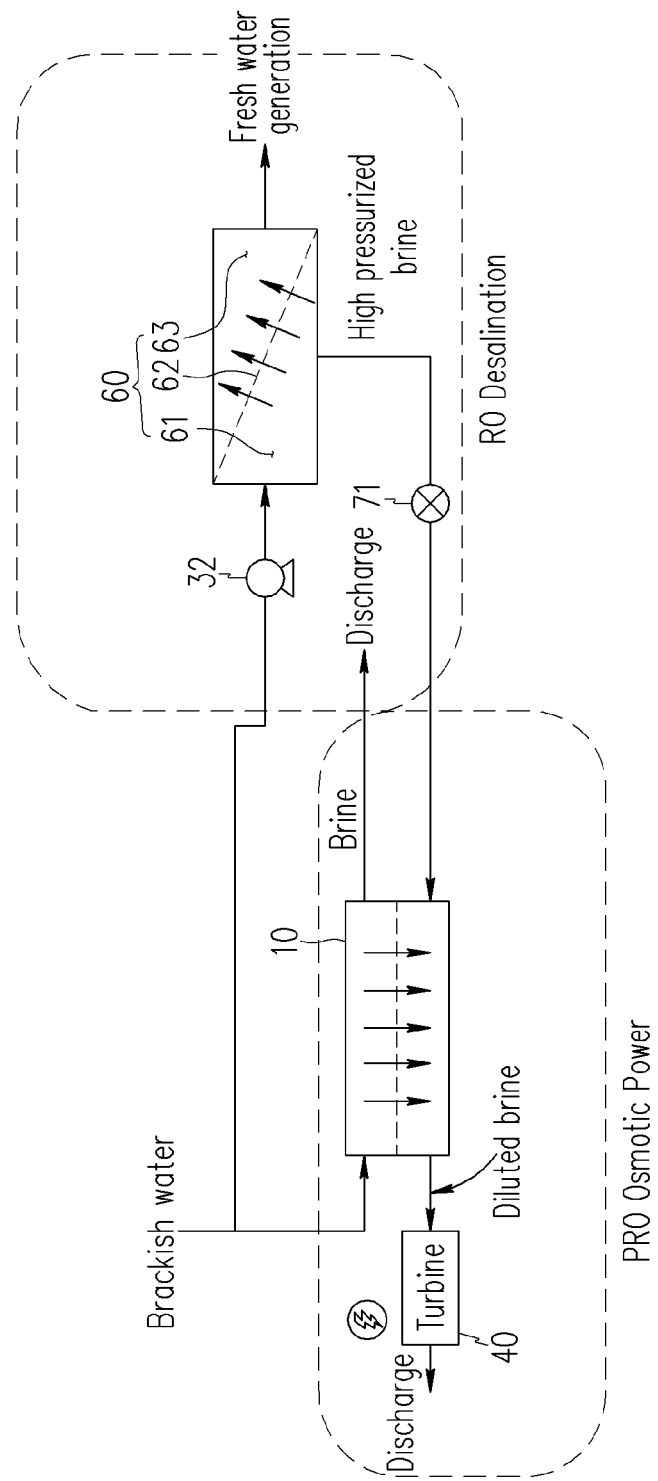
FIG. 11 is a schematic view of an apparatus for osmotic power generation and desalination according to a third embodiment of the present invention.

FIG. 11 is a schematic view of an apparatus for osmotic power generation and desalination according to a third embodiment of the present invention.

The apparatus for osmotic power generation and desalination according to the third embodiment of the present invention includes a forward osmotic membrane reactor 10 and a reverse osmotic membrane reactor 60, and is driven by supplying brackish water to the forward osmotic membrane reactor 10 and the reverse osmotic membrane reactor 60.

The forward osmotic membrane reactor 10 includes the first salt water position space 11 through which supplied brackish water passes and the third salt water position space 12 through which brackish water having a higher concentration of salt than that of brackish positioned in the first salt water position space 11. The first salt water position space and the third salt water position space 12 are separated by a forward osmotic membrane 13.

The reverse osmotic membrane reactor 60 includes a second salt water position space 61 through supplied brackish water passes and a fresh water position space 63 in which fresh water is positioned. The second salt water position space 61 and the fresh water position space 63 are separated by a reverse osmotic membrane 62.

A high pressure pump 32 is installed at an upstream side of the reverse osmotic membrane reactor 60 in order to apply pressure to brackish water supplied to the second salt water position space 61.

The second salt water position space 61 and the third salt water position space 12 are connected, so brackish water discharged from the second salt water position space 61 is supplied to the third salt water position space 12. A pressure reduction valve 71 is connected between the second salt water position space 61 and the third salt water position space 12 to reduce the pressure of the brackish water supplied to the third salt water position space 12. In general, the reverse osmotic membrane reactor 60 discharges a high concentration flow having about 50 to 60 atmospheric pressure, and in this case, since the pressure required for the osmotic power generation process is about 5 to 15 atmospheric pressure, so the pressure can be lowered by using the pressure reduction valve 71.

The turbine 40 is connected to a downstream side of the third salt water position space 12 and driven by flow force of the brackish water discharged from the third salt water position space 12 to generate electric energy.

Since the reverse osmotic membrane reactor 60 discharges a high pressure high concentration flow, power can be advantageously generated by using the pressure energy and chemical energy thereof. Thus, when brackish water is supplied to the third salt water position space 12, an additional high pressure pump is not required, and rather, a process of lowering the pressure by using the pressure reduction valve 71 is required in order to adjust the pressure required for the osmotic power generation process.

Figure 12:
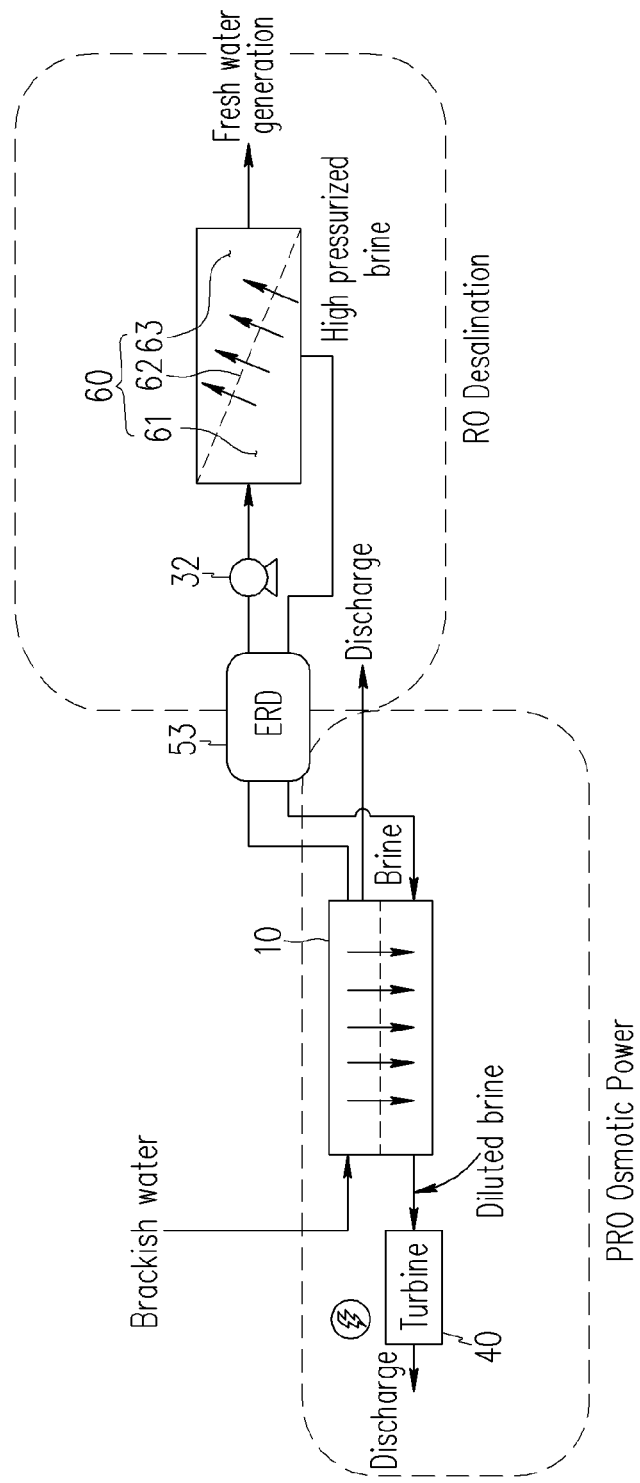
FIG. 12 is a schematic view of an apparatus for osmotic power generation and desalination according to a fourth embodiment of the present invention.

FIG. 12 is a schematic view of an apparatus for osmotic power generation and desalination according to a fourth embodiment of the present invention.

Like that of the third embodiment of the present invention, the apparatus for osmotic power generation and desalination according to the fourth embodiment of the present invention includes the forward osmotic membrane reactor 10 and the reverse osmotic membrane reactor 60, and is driven by supplying brackish water to the forward osmotic membrane reactor 10 and the reverse osmotic membrane reactor 60.

In the present embodiment, the first salt water position space 11 of the forward osmotic membrane reactor 10 is connected with the second salt water position space 61 of the reverse osmotic membrane reactor 60, so brackish water discharged from the first salt water position space 11 is supplied to the second salt water position space 61.

An ERD 53 is connected between the second salt water position space 61 of the reverse osmotic membrane reactor 60 and the third salt water position space 11 of the forward osmotic membrane reactor 10 to allow brackish water discharged from the second salt water position space 61 to pass therethrough. At the same time, brackish water discharged from the first salt water position space 11 and supplied to the second salt water position space 61 is allowed to pass through the ERD 53.

High pressure high salinity brine discharged from the second salt water position space 61 is introduced into the ERD 53, is in direct contact with the supplied brackish water (or feed brackish water) to deliver pressure, and then, transferred to the third salt water position space 12 in a state of having a lowered pressure.

The ERD 53 may reduce a load of the high pressure pump 32 by using the pressure of a portion of the high pressure and high salinity brine discharged from the second salt water position space 61 to actually increase a net power generation of the apparatus for an osmotic power generation, and an installation of a pressure reduction valve may be omitted.

Figure 13:
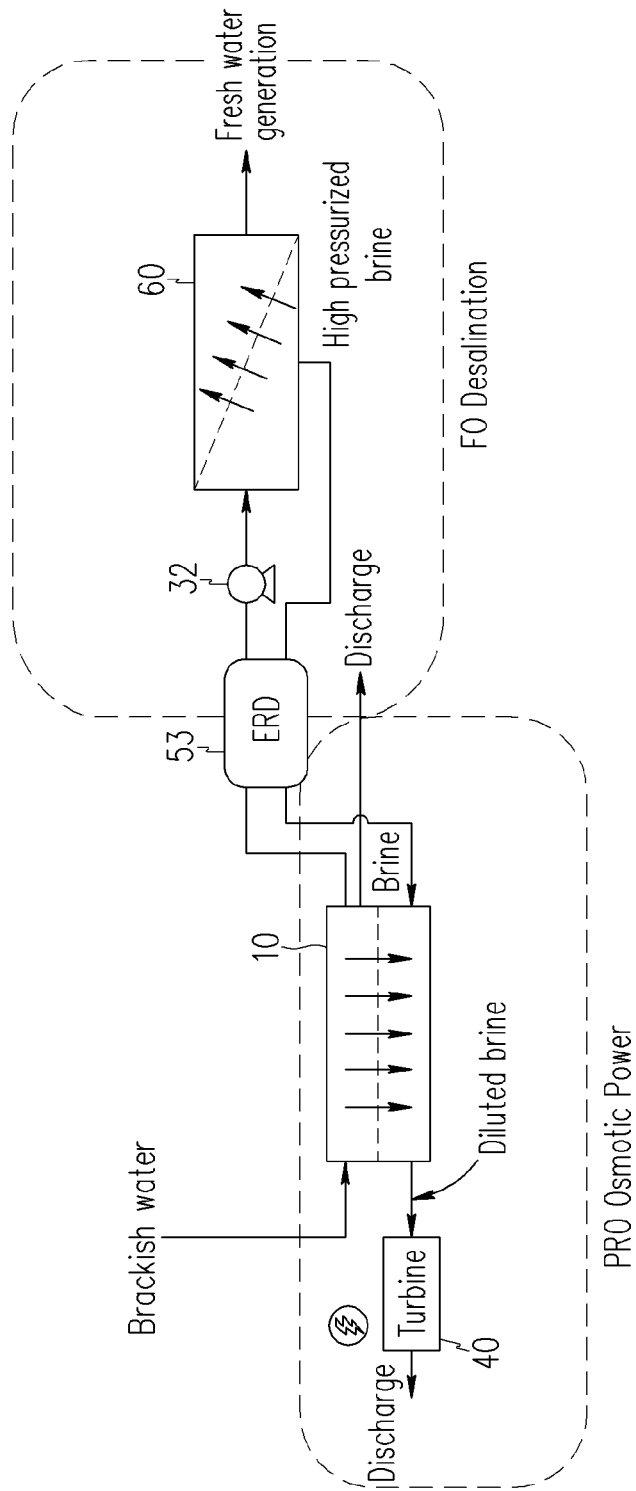
FIG. 13 is a schematic view of a modification of an apparatus for osmotic power generation and desalination according to the fourth embodiment of the present invention.

FIG. 13 is a schematic view of a modification of an apparatus for osmotic power generation and desalination according to the fourth embodiment of the present invention.

In the modification, brackish water is supplied to the first salt water position space 11 of the forward osmotic membrane reactor 10 and the second salt water position space 61 of the reverse osmotic membrane reactor 60 through separate paths, and the first salt water position space 11 and the second salt water position space 61 are not connected.

Also, the ERD 53 is connected between the second salt water position space 61 of the reverse osmotic membrane reactor 60 and the third salt water position space 11 of the forward osmotic membrane reactor 10, to allow brackish water discharged from the second salt water position space 61 to pass therethrough. At the same time, brackish water supplied to the second salt water position space 61 is allowed to pass through the ERD 53.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for osmotic power generation and desalination using a salinity difference, the apparatus comprising:
    a first osmotic membrane reactor including a first salt water position space through which supplied salt water passes, and a third salt water position space through which salt water having a salt concentration higher than that of salt water positioned in the first salt water position space passes, the first and third salt water position spaces being separated by a first forward osmotic membrane;
    a second osmotic membrane reactor including a second salt water position space through which supplied salt water passes, and a draw solution position space in which a draw solution is positioned, the second salt water position space and the draw solution position space being separated by a second forward osmotic membrane;
    a high pressure pump connected between the second salt water position space and the third salt water position space and supplying salt water which has passed through the second salt water position space to the third salt water position space and pressurizing salt water, which has passed through the second salt water position space, to supply it to the third salt water position space such that pressure retarded osmosis (PRO) can be made in the first osmotic membrane reactor;
    a desalination unit obtaining fresh water by separating a draw solute from a draw solution diluted through a transmission of water in salt water of the second salt water position space by way of the draw solution position space of the second osmotic membrane reactor; and
    a turbine connected to a downstream side of the third salt water position space and driven by flow force of salt water discharged from the third salt water position space to produce electric energy.

2. The apparatus of claim 1, wherein the first salt water position space of the first osmotic membrane reactor and the second salt water position space of the second osmotic membrane reactor are connected, and salt water, which has passed through the first salt water position space, flows into the second salt water position space.

3. The apparatus of claim 1, further comprising:
    an energy recovery device (ERD) connected between the second salt water position space and the high pressure pump and configured to allow salt water, which is discharged from the second salt water position space, to pass therethrough,
    wherein salt water discharged from the third salt water position space may pass through the energy recovery device.

4. The apparatus of claim 1, wherein salt water supplied to the first salt water position space is seawater or brackish water.

\* \* \* \* \*